United States Patent
Knepper et al.

(10) Patent No.: US 7,401,243 B2
(45) Date of Patent: Jul. 15, 2008

(54) DEMAND-BASED DYNAMIC CLOCK CONTROL FOR TRANSACTION PROCESSORS

(75) Inventors: Lawrence Edward Knepper, Lago Vista, TX (US); Shuguang Wu, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 361 days.

(21) Appl. No.: 11/157,243

(22) Filed: Jun. 21, 2005

(65) Prior Publication Data

US 2006/0288249 A1    Dec. 21, 2006

(51) Int. Cl.
*G06F 1/32* (2006.01)

(52) U.S. Cl. .................. 713/322; 713/300; 713/310; 713/320; 713/321; 713/323; 713/324; 713/330; 713/340

(58) Field of Classification Search .......... 713/300, 713/310, 320–324, 330, 340
See application file for complete search history.

(56) References Cited

U.S. PATENT DOCUMENTS

| | | | | |
|---|---|---|---|---|
| 5,189,314 | A * | 2/1993 | Georgiou et al. | 327/114 |
| 5,974,557 | A * | 10/1999 | Thomas et al. | 713/322 |
| 6,487,668 | B2 * | 11/2002 | Thomas et al. | 713/322 |
| 6,788,156 | B2 | 9/2004 | Tam et al. | |
| 6,901,524 | B2 * | 5/2005 | Watts, Jr. | 713/322 |
| 7,131,015 | B2 * | 10/2006 | Flautner et al. | 713/320 |
| 7,194,385 | B2 * | 3/2007 | Flautner et al. | 702/186 |

* cited by examiner

*Primary Examiner*—Elamin Abdelmoniem
(74) *Attorney, Agent, or Firm*—Haynes and Boone, LLP

(57) ABSTRACT

A variable speed data processor includes a clock generator generating a plurality of clocks at different clock rates. Clock select circuitry synchronously selects one of the clocks as an output clock signal to data processing circuitry, based on a data activity indication. Activity logic generates the data activity indication based at least in part on the existence of data processing activity targeted to the data processing circuitry. When the data processing circuitry experiences bursty data processing activity, the clock rate can shift rapidly between the multiple clock rates, conserving power without substantially diminishing the availability of the data processing circuitry.

20 Claims, 4 Drawing Sheets

DEMAND-BASED DYNAMIC CLOCK CONTROL FOR TRANSACTION PROCESSORS

BACKGROUND

The present disclosure relates generally to information handling systems, and more particularly to operating such a system or component thereof at multiple clock speeds.

The present disclosure relates generally to information handling systems, and more particularly to an apparatus and method for operating such a system or component thereof at multiple clock speeds.

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems use one or more integrated circuits to process and/or store data. Integrated circuits typically contain thousands—and in many cases millions—of transistors and other elements arranged in logical blocks. Many such logical blocks are formed using arrangements of, e.g., field-effect transistors (FETs), which consume power when switched, and consume little or no power in a stable state.

The logical blocks in an integrated circuit often operate according to a reference clock signal that controls the flow of data through the circuit in an orderly and predictable fashion. As the clock rate of the reference signal is increased, the integrated circuit can process data faster (up to a point where thermal or minimum timing budgets can no longer be met). But because the logical blocks switch more times per second at a higher clock rate, the power dissipated by the integrated circuit increases as a function of the clock rate.

Others have recognized that in some applications, power consumption can be reduced by tailoring the speed to the processing load. For instance, some mobile processors use a technology that can temporarily halt a processor core, change the processor clock rate, and then resume the processor core, when the mobile processor switches between external power and battery power.

One known system describes an integrated circuit clocking system using two voltage-controlled oscillators (VCOs). The first VCO functions in a phase-locked loop (PLL) that maintains a desired frequency relationship to an input reference clock. The control voltage supplied by the PLL to the first VCO is also supplied to a second VCO, which actually supplies the core clock signal to the integrated circuit after an initialization period.

A mixer allows the control voltage to be offset at the input to the second VCO by one of several selectable voltages. A controller can step between the selectable voltages to slew the VCO frequency in small frequency increments, to decrease the core clock signal by up to 25% in steps when appropriate. Thus power consumption can be tailored over time to sensed current, power, temperature, or processing load without stalling the processor.

SUMMARY

A data processor comprises a clock generator, clock select circuitry, data processing circuitry, and activity logic. The clock generator simultaneously generates a plurality of reference clock signals at different clock rates. The clock select circuitry synchronously selects one of the reference clock signals as an output clock signal, based on a data activity indication. The data processing circuitry operates based on the output clock signal. The activity logic generates the data activity indication based at least in part on the existence of data processing activity targeted to the data processing circuitry.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

Figure 1:
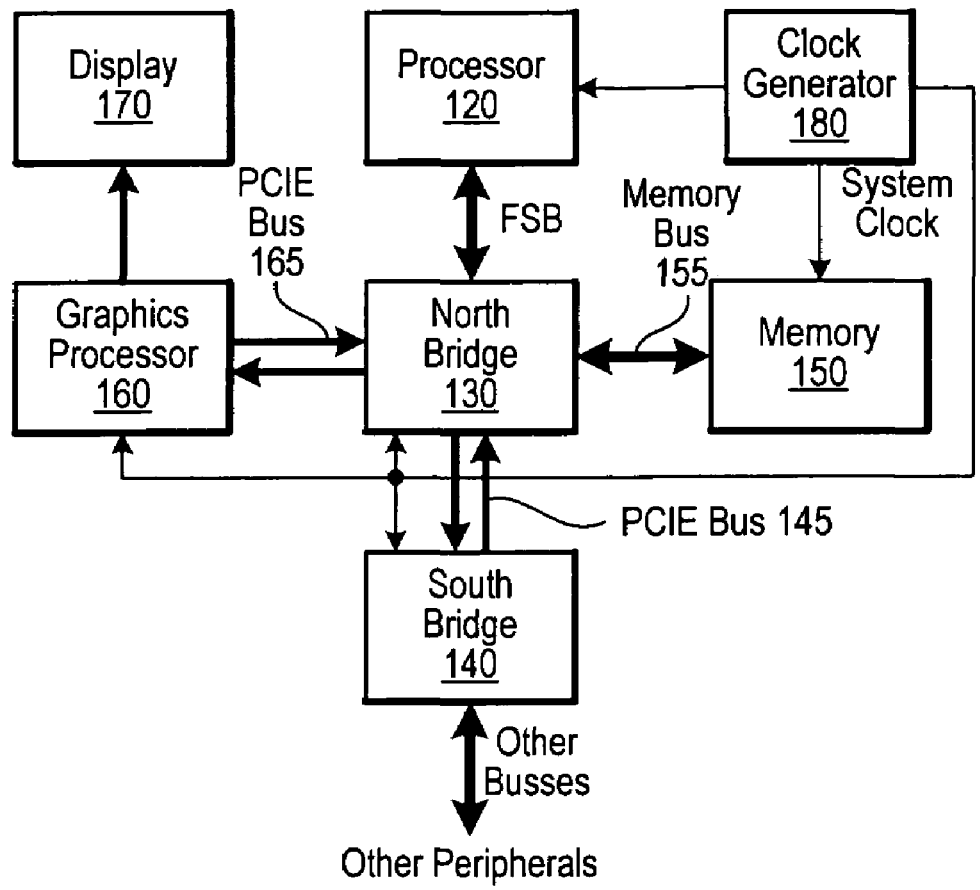
FIG. 1 shows a prior art information handling system that can be adapted to include an embodiment described herein.

In one embodiment, information handling system 100, FIG. 1, is a computer system that include at least one processor 120, which is connected to a bus FSB. Bus FSB serves as a connection between processor 120 and other components of computer system 100. In the illustrated configuration, bus FSB connects processor 120 to a North Bridge 130, part of a "chipset" that also includes a South Bridge 140.

In addition to interfacing with processor 120, North Bridge 130 maintains three interfaces to other system components. North Bridge 130 interfaces with high-speed memory 150, e.g., Synchronous Dynamic Random Access Memory (SDRAM), across a memory bus 155. North Bridge 130 interfaces with a graphics processor 160 across a graphics bus, which in this case is shown as a PCI Express bus ("PCIE bus") 165 conforming to the Peripheral Component Interconnect Express specification "PCI Express Base Specification 1.0a" promulgated by the PCI Special Interest Group (SIG). North Bridge 130 interfaces with South Bridge 140 across a second PCIE bus 145.

South Bridge 140 connects to other buses and peripherals that can exist in various computer systems. These other buses can include parallel and/or serial ATA buses or SCSI buses for connection to mass storage devices such as hard disks, optical disks, magneto-optical drives, floppy drives, and the like. Other PCIE or PCI buses can connect to network interface cards, flash memory, video/audio capture devices, and other peripherals. Universal Serial Bus, IEEE 1394, serial bus, parallel bus, and other bus ports can connect directly to south bridge 140, or be bridged by other devices. Such bus ports can provide connections for input devices such as a keyboard, a touchscreen, and pointing devices such as a mouse, trackball, or trackpad.

A display 170 is typically connected to graphics processor 160 to provide visual program output for computer programs running on processor 120.

A clock generator 180 supplies a system clock to, e.g., processor 120, North Bridge 130, South Bridge 140, memory 150, and graphics processor 160. Clock generator 180 generally provides a stable reference for other system components to phase-lock with, and to base their bus transfer rates on.

This description is not intended to be all-inclusive, but to provide common examples of computer system configuration. Not all computer systems use the basic chipset configuration shown herein, and many such systems include fewer or more components.

It is recognized herein that some processors, such as graphics processors, contain circuitry that could benefit from a different form of variable clocking than that provided by the prior art. Such processors may contain some functions that are sometimes used sporadically, but that may require fast response and/or high throughput when active, such as a three-dimensional (3D) graphics processing engine. It would be advantageous to provide for different clock rates for such an engine, depending on whether graphics activity is currently targeted to the 3D graphics engine. But because graphics latency is undesirable, a variable clocking method would be much more attractive were it possible to provide near-instantaneous switching between the clock rates. Also, such a capability could allow frequent clock rate switching at the edges of graphics activity bursts.

Of particular interest in describing an embodiment is the method in which computer system 100 produces displayable output to a user on display 170. Many programs have features that allow users to display text and stationary graphics or images on one or more displays 170. Some programs have features that display video and animated graphics. In many information handling systems, processor 120 relies on graphics processor 160 to produce much of this displayable output, freeing the processor to perform other tasks, and generally providing a more fluid graphics experience than would exist if the processor had to render all graphics itself.

For stationary graphics and text, graphics processor 160 provides graphics functions that can be requested by processor 120. Typical functions include line-drawing, block-filling (or, more generally, polygon-filling), shading, block translation, and copy-block-from-memory functions that can be invoked and executed without further processor intervention. Graphics processor 160 may directly access graphical elements stored in memory 150 to build the requested graphics to an internal frame buffer. The contents of the internal frame buffer are read in an appropriate video format to display 170 at a desired frame rate. Processor 120 sends graphics requests to graphics processor 160 over PCIE bus 165.

For video and animated graphics, graphics processor can provide even more powerful capabilities. Digital video is stored in a compressed format that cannot be displayed until decoded with an appropriate codec (coder/decoder). Graphics processors can provide a video codec, or some subfunctions of such a codec, to aid processor 120 in displaying digital video. Graphics processors can also provide a 3D pipeline to render three-dimensional images and animation, e.g., for computer-aided design, gaming, etc. The 3D pipeline may provide such functions as z-buffering, polygon fill and texture application, lighting, shading, anti-aliasing, etc. Typically, the graphics processor will retain recently used texture maps and polygon data in its onboard memory, and obtains other maps and data from memory 150 when needed, by interacting directly with North Bridge 130 over PCIE bus 165.

Figure 2:
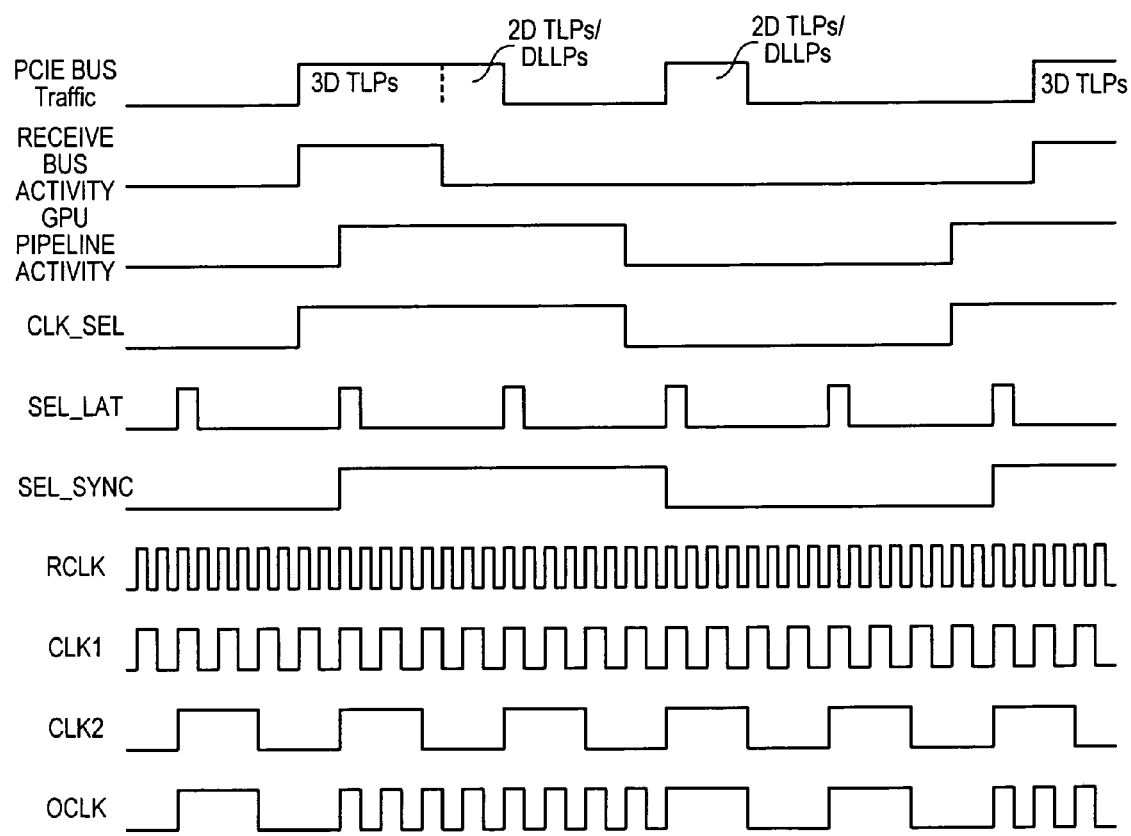
FIG. 2 contains a timing diagram for operation according to an embodiment.
Figure 3:
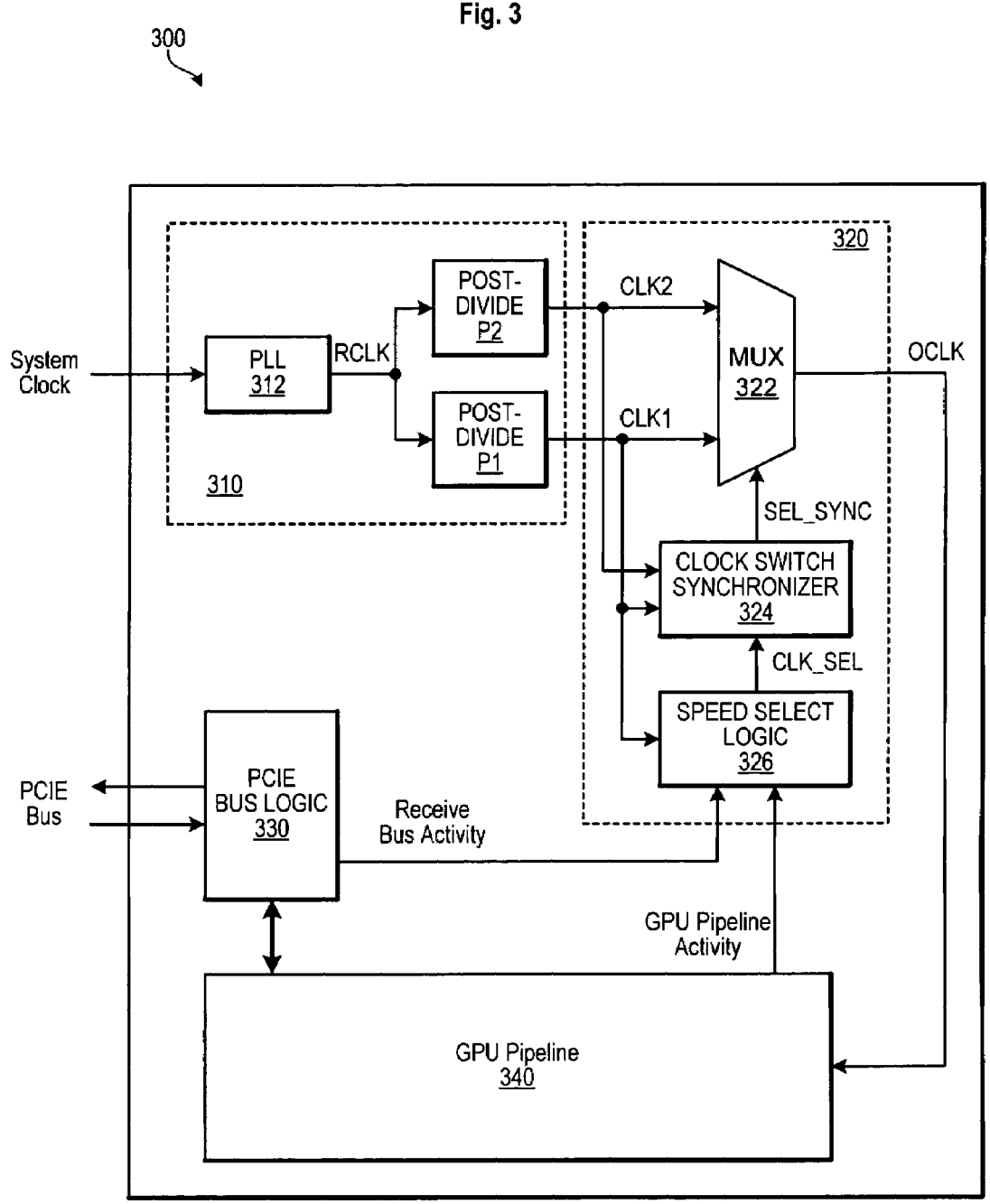
FIG. 3 illustrates, in block diagram form, some elements of a graphics processor according to an embodiment.

FIG. 2 contains a timing diagram for a graphics processor embodiment 300 illustrated in FIG. 3. Briefly, graphics processor 300 comprises a clock generator 310, clock select circuitry 320, PCIE bus logic 330, and a GPU pipeline 340.

Clock generator 310 comprises a phase-locked loop (PLL) 312 and two post-divide circuits P1 and P2. PLL 312 receives an external system clock signal and creates an internal reference clock RCLK based on the system clock, e.g., in phase with the system clock and related to the system clock by a ratio N:M, where N and M are integers.

Post-divide circuits P1 and P2 further divide RCLK to produce two clock signals CLK1 and CLK2. In FIG. 2, CLK1 is shown half the rate of RCLK and CLK2 is one-eighth the rate of RCLK, although any two appropriate ratios (including 1:1 for CLK1) can be selected for CLK1 and CLK2. Circuits P1 and P2 can be implemented, for instance, using counters.

Clock select circuit 320 comprises a multiplexer (MUX) 322, a clock switch synchronizer 324, and speed select logic 326. Multiplexer 322 receives CLK1 and CLK2, and selects one of the two clocks as an output clock OCLK. The multiplexer contains a selection input that receives a synchronized selection signal SEL_SYNC from clock switch synchronizer 324. SEL_SYNC can switch OCLK between CLK1 and CLK2 at certain times, as will be explored further below.

Clock switch synchronizer 324 produces SEL_SYNC in response to a CLK_SEL signal supplied by speed select logic 326. The task of synchronizer 324 is to apply CLK_SEL to MUX 322 at a time that will not produce a timing glitch, i.e., an interval between two OCLK clock transitions that is substantially shorter than a standard CLK1 clock transition. One way to accomplish this task is to latch CLK_SEL to SEL_SYNC near a time when CLK1 and CLK2 both have positive clock edges or both have negative clock edges that are closely aligned. For instance, synchronizer 324 generates an internal SEL_LAT latch signal (not shown in FIG. 3) based on CLK1 and CLK2 each time a positive transition of CLK1 coincides with a positive transition of CLK2. Thus the CLK_SEL signal is re-timed to produce an OCLK clock signal that cleanly varies between CLK1 and CLK2 as requested.

The complexity of clock switch synchronizer 324 may depend on the relationship between CLK1 and CLK2. When the CLK1 clock rate is an integer multiple of the CLK2 clock rate (with positive edges aligned as shown), the positive edge of CLK2 can be used as the SEL_LAT signal. With appropriate logic, clock select transitions in a specific direction could be allowed according to other schemes as well, e.g., from CLK2 to CLK1 on any negative edge of CLK1.

The embodiments are not limited to integer CLK1/CLK2 multiples. Generally, two edge-triggered short pulse generators based respectively on CLK1 and CLK2 latches can be used to determine when CLK1 and CLK2 edges are sufficiently aligned to allow a transition. The pulse duration and SEL_LAT can be based, e.g., on RCLK.

Speed select logic 326 bases CLK_SEL on knowledge of the activity level of data processing circuitry in graphics processor 300, e.g., GPU pipeline 340. For instance, GPU pipeline 340 can contain activity logic that asserts the GPU pipeline activity signal when either: a) a shader execution unit is processing shader instructions, data references, or state changes; b) shader instructions, context, state information, or data (vertex descriptions, texture data, pixel descriptors such as color, alpha, depth, etc.) are being loaded or unloaded from the pipeline's buffers or registers; and/or c) such operations are imminent, e.g., the operations are queued in buffers ready for execution as soon as a needed resource becomes available. When none of these conditions are true, GPU pipeline 340 deasserts the GPU pipeline activity signal.

In many instances, it may be possible for PCIE bus logic 330 to become aware that GPU pipeline activity is imminent, even before GPU pipeline 340 receives instructions. The PCIE bus uses packet-based communications to perform data transfers. Each packet can be classified as either a Link Layer Transaction Packet (LLTP) or a Data Link Layer Packet (DLLP). The DLLPs relate to the state of the PCIE bus entities themselves, and are consumed by PCIE bus logic 330. The LLTPs contain data payloads, some of which may be targeted to GPU pipeline 340, and some of which may be targeted to other data units (not shown) in the graphics processor. Each LLTP encapsulates a Transaction Layer Packet (TLP), which contains a header, encapsulated data or payload, and a digest field. The header encodes whether the data represents a Memory, I/O, Configuration, or Message packet. Of these types, only Memory TLPs represent data targeted for pipeline 340. The header address field of a Memory TLP will determine whether the data represents pipeline configuration, status, shader instructions, textures, vertex streams, etc. In one embodiment, then, PCIE bus logic 330 contains activity logic to assert a Receive Bus Activity signal to speed select logic 326 when it receives an LLTP containing a valid TLP, the TLP contains a reference targeted to GPU pipeline 340, and bus logic 330 is ready to transmit the TLP contents to GPU pipeline 340. As shown in FIG. 2, PCIE bus activity directed to the GPU pipeline causes the assertion of the Receive Bus Activity signal, and other PCIE bus activity does not.

In one embodiment, speed select logic 326 uses both the Receive Bus Activity signal and the GPU Pipeline Activity signal to determine what value of OCLK to supply to GPU pipeline 340. Speed select logic 326 ORs the two activity signals to generate CLK_SEL. It is noted that periods of activity in an actual processor generally span many more clock periods than are illustrated in FIG. 2, but the concept is illustrated over even a few clock periods.

In some embodiments, the GPU pipeline activity logic may determine that even though it is not quiesced, it does not require the higher clock rate to perform the tasks it has been assigned. For instance, a given combination of frame rate, graphics image size, number of active polygons, and shading method may be met by GPU pipeline 340 at the CLK2 rate. In this case, GPU pipeline 340 can indicate low activity, even though it is not quiesced. The activity signal can also have more than two states in some embodiments, allowing MUX 322 to select between more than two clock references.

In some embodiments, an override signal can be provided (not shown) that forces speed select logic 326 to select either the CLK1 rate or the CLK2 rate, regardless of the state of the receive bus activity and GPU pipeline activity signals, or forces the state of one or both of the receive bus activity and GPU pipeline activity signals. For instance, a user can be provided with a power management control panel that allows the user to select, for a given power mode, either a high graphics/high power setting, a low graphics/low power setting, or a power-managed high graphics setting. The first two settings force MUX 322 to select, respectively, CLK1 and CLK2, and do not vary clock speed with activity indication. The third setting allows speed selection as explained above. Although a user setting is one example, other system or software conditions could provide an override as well, such as a computer game that requires maximum GPU availability, and therefore activates the override when the game is active.

Figure 4:
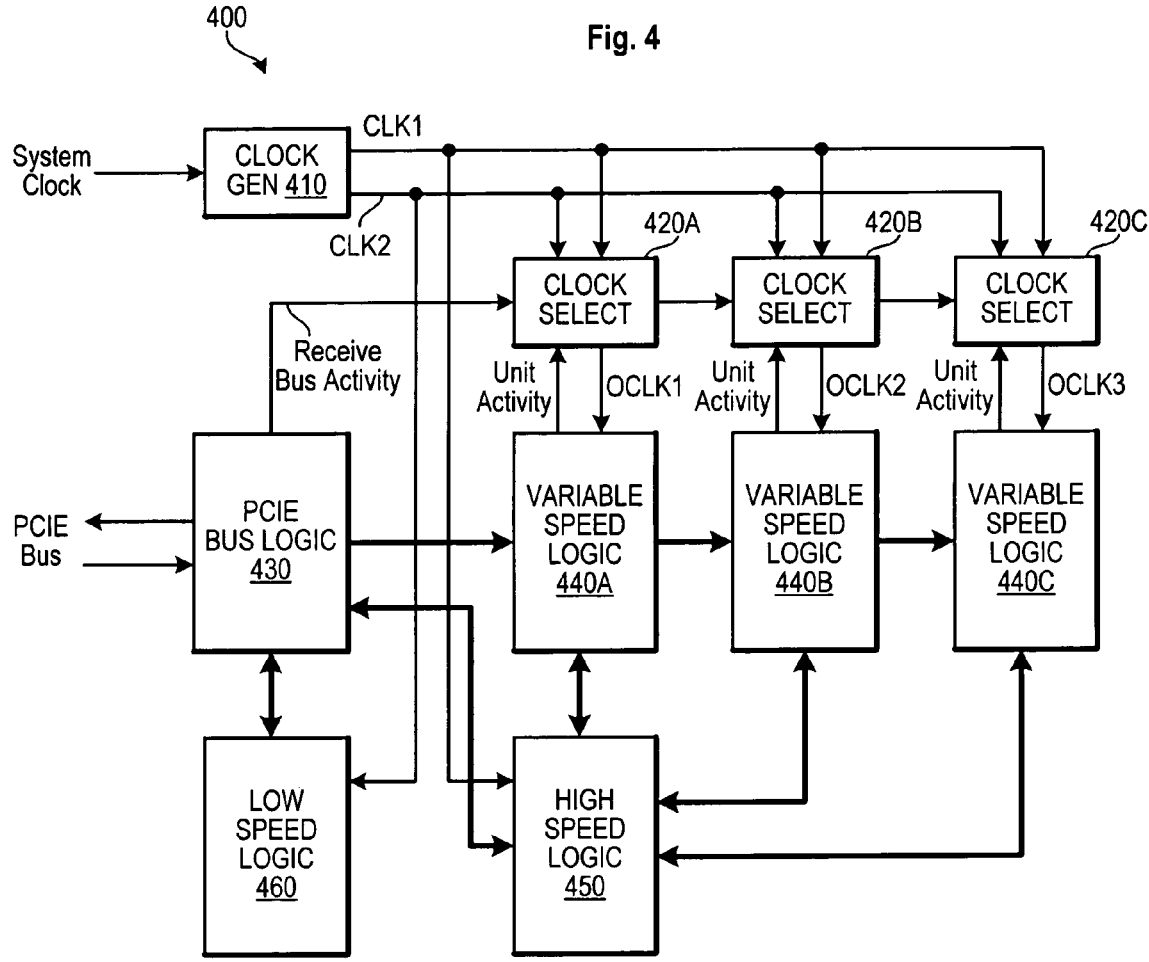
FIG. 4 illustrates an embodiment with multiple variable speed logic sections that have independently variable clock rates.

FIG. 4 shows a data processor 400 including multiple variable speed logic units. A clock generator 410 receives a system clock and generates two clocks CLK1 and CLK2, e.g., similar to clock generator 310 of FIG. 3. High-speed clock CLK1 is applied to a high-speed logic block 450, and to three clock select circuits 420A, 420B, and 420C. Low-speed clock CLK2 is supplied to low speed logic 460 and to clock select circuits 420A, 420B, and 420C.

Clock select circuits 420A, 420B, and 420C generate respective output clock signals OCLK1, OCLK2, and OCLK3 to three variable speed logic units 440A, 440B, and 440C. Variable speed logic 440A, 440B, and 440C can operate independently through high-speed logic 450, or can be chained serially such that logic 440B operates on an output of logic 440A and logic 440C operates on an output of logic 440B. Each clock select circuit selects CLK1 or CLK2 for the clock rate of its assigned variable speed logic unit based on unit activity. Clock select circuit 420A bases its output clock rate on the unit activity of logic 440A and receive bus activity (for logic 440A) from PCIE bus logic 430. Clock select circuit 420B bases its output clock rate on the unit activity of logic 440B, receive bus activity for logic 440B, and on an imminent activity signal from logic 440A when the units are chained serially. Likewise, clock select circuit 420C bases its output clock rate on the unit activity of logic 440C, receive bus activity for logic 440C, and on an imminent activity signal from logic 440B when the units are chained serially. Thus each variable speed logic unit can be sped up and slowed down independent of the other variable speed logic units, according to the near-term processing requirements of each logic unit.

Although graphics processors have been used in exemplary embodiments, the principles disclosed herein are applicable to other data processors. For instance, packet processors can be partitioned such that the clock rate of individual engines on a processor can be tailored to the activity of each engine. Those skilled in the art will recognize after reading this disclosure that a variety of logic circuits other than those specifically disclosed are available for implementing the functions described herein. For instance, stage outputs of a common multi-stage counter can be used to implement the multiple clock outputs of the clock generator in some embodiments. Activity logic will generally depend on the characteristics of the data processor for which the variable speed clock is supplied.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A graphics data processor comprising:
   a clock generator to simultaneously generate a plurality of reference clock signals at different clock rates;
   first clock select circuitry to synchronously select one of the reference clock signals as an output clock signal, the clock select circuitry selecting one of the reference clock signals based on a data activity indication;
   a graphics processing engine operable based on the output clock signal; and
   first activity logic to detect bus transactions to be directed to the graphics processing engine and to generate the data activity indication based at least in part on the existence of graphics processing activity targeted to the graphics processing engine;
   wherein the data graphics processing engine is a three-dimensional graphics engine, and wherein the data activity indication is further based on one or more graphics parameters.

2. The graphics data processor of claim 1, wherein the plurality of reference clock signals comprises two clocks.

3. The graphics data processor of claim 2, wherein the clock rates of the two clocks are related by an integer multiple.

4. The graphics data processor of claim 1, wherein the activity logic comprises logic to detect, from among a set of bus transactions including bus transactions targeting the graphics processing engine and bus transactions that do not target the graphics processing engine, the bus transactions targeting the graphics processing engine, and generating the data activity indication when bus transactions targeting the graphics processing engine are detected.

5. The graphics data processor of claim 4, wherein the graphics processingengine is a three-dimensional (3D) graphics processing engine.

6. The graphics data processor of claim 5, further comprising:
   a two-dimensional graphics processing engine operable based on a single reference clock.

7. The graphics data processor of claim 1, wherein the activity logic comprises logic to detect when the data processing circuitry is actively processing data.

8. The graphics data processor of claim 7, wherein the data activity indication comprises at least two levels indicating different levels of non-zero data processing activity, one of the two indication levels requiring a higher clock rate than the other.

9. The graphics data processor of claim 8, further comprising:
   second clock select circuitry to synchronously select one of the reference clock signals as a second output clock signal, the second clock select circuitry selecting one of the reference clock signals based on a second data activity indication;
   a data processing circuitry operable based on the second output clock signal; and
   second activity logic to generate the second data activity indication based at least in part on the existence of data processing activity targeted to the second data processing circuitry.

10. The graphics data processor of claim 9, wherein the graphics processing engine readies data for the data processing circuitry, the second activity logic generating the second data activity indication when the graphics processing engine readies data for the data processing circuitry.

11. The graphics data processor of claim 1, further comprising:
    a second data processing circuitry operable operably based on a non-selectable one of the reference clock signals.

12. The graphics data processor of claim 1, wherein the one or more graphics parameters are selected from a group of parameters consisting of parameters related to: a number of active polygons, a frame rate, a graphics image size, and a shading method.

13. An information handling system comprising:
    a data bus; and
    a graphics data processor having a clock generator to simultaneously generate a plurality of reference clock signals at different clock rates, an internal dynamic clock controller to synchronously select one of the reference clock signals, data processing circuitry operable based on the selected reference clock signal, and activity logic to signal the dynamic clock controller based at least in part on the existence of data bus activity targeted to the data processing circuitry;
    wherein the data processing circuitry is a three-dimensional (3D) graphics processing engine, the data processor further comprising a two-dimensional (2D) graphics processing engine, and wherein the activity logic differentiates between data bus activity targeted to the 2D and 3D graphics processing engines.

14. The information handling system of claim 13, wherein the 2D graphics processing engine is operable based on a single reference clock.

15. The information handling system of claim 13, wherein the graphics data processor is a packet processor.

16. A method of operating a graphics data processor, the method comprising:
    simultaneously generating a plurality of reference clock signals at different clock rates;
    analyzing whether data processing activity is targeted to a segment of the data processor; and
    synchronously selecting one of the reference clock signals to apply to the segment of the graphics data processor based at least in part on whether data processing activity is targeted to the segment of the graphics data processor;
    wherein the segment of the data processor is a three-dimensional (3D) graphics processing engine, wherein analyzing whether data processing activity is targeted to a segment of the graphics data processor comprises detecting when the 3D graphics processing engine is actively processing 3D graphics data.

17. The method of claim 16, further comprising:
    generating the reference clock signals by dividing a master clock signal by different values.

18. The method of claim 16, further comprising:
    receiving bus transactions, including bus transactions targeting the segment of the graphics data processor and bus transactions that do not target the segment of the graphics data processor, wherein analyzing comprises detecting bus transactions targeting the segment of the graphics data processor.

19. The method of claim 18, wherein synchronously selecting one of the reference clock signals comprises selecting a reference clock signal at a higher clock rate when bus transactions are targeted to the segment of the graphics data processor than the clock rate of the reference clock signal selected when the segment of the graphics data processor is not processing data.

20. The method of claim 16, wherein selecting one of the reference clock signals further comprising basing the selection of a clock rate on one or more processing parameters set for the 3D graphics processing engine.

* * * * *